United States Patent [19]
McDonald et al.

[11] Patent Number: 6,059,372
[45] Date of Patent: May 9, 2000

[54] HOPPER BOTTOM TRAILER

[75] Inventors: Harley C. McDonald; Matthew C. McDonald, both of Omaha, Nebr.

[73] Assignee: Composite Structures, Inc., Omaha, Nebr.

[21] Appl. No.: 08/987,705

[22] Filed: Dec. 9, 1997

[51] Int. Cl.$^7$ ..................................................... B60P 1/56
[52] U.S. Cl. ........................... 298/8 H; 298/8 T; 298/27; 298/28
[58] Field of Search ................................... 298/8 H, 8 T, 298/27, 28; 105/247, 248, 249

[56]  References Cited

U.S. PATENT DOCUMENTS

| | | | |
|---|---|---|---|
| D. 265,982 | 8/1982 | Miller | D12/1 |
| D. 290,591 | 6/1987 | Shirvanian | D12/15 |
| D. 296,999 | 8/1988 | Morse | D12/15 |
| D. 349,872 | 8/1994 | Chaseling et al. | D12/15 |
| 2,616,758 | 11/1952 | Meyers | 298/7 |
| 3,139,286 | 6/1964 | Johnson | 298/8 H |
| 4,018,480 | 4/1977 | Stone | 298/27 |
| 4,124,167 | 11/1978 | Coleman | 239/673 |
| 4,398,653 | 8/1983 | Daloisio | 222/185 |
| 4,497,258 | 2/1985 | Ruhmann et al. | 105/248 |
| 4,608,931 | 9/1986 | Ruhmann et al. | 105/248 |
| 4,818,024 | 4/1989 | Michel | 298/27 |
| 5,108,038 | 4/1992 | Palladino et al. | 239/661 |
| 5,294,186 | 3/1994 | DeCap | 298/35 M |
| 5,324,097 | 6/1994 | DeCap | 298/35 M |
| 5,326,156 | 7/1994 | Heider et al. | 298/24 |
| 5,346,286 | 9/1994 | Oberle | 298/8 H |

OTHER PUBLICATIONS

Timpte Brochure, Undated, Untitled, 8 pages.

*Primary Examiner*—Stephen T. Gordon
*Attorney, Agent, or Firm*—Suiter & Associates, PC

[57]  ABSTRACT

An open top vessel containing bulk or liquid material comprising an inclined front wall, an inclined rear wall, and inclined opposite side walls. The walls of the vessel extend downwardly and inwardly from the upper ends thereof towards the lower ends thereof towards a discharge opening formed at the lower end of the vessel. A support frame is provided for supporting the vessel and includes at least a pair of horizontally spaced-apart, horizontally disposed support frame members which receive inverted U-shaped supports on the upper end of the vessel. The vessel is ideally suited for use as a hopper bottom in a hopper bottom trailer. The vessel is comprised of a fiber reinforced plastic material.

40 Claims, 8 Drawing Sheets

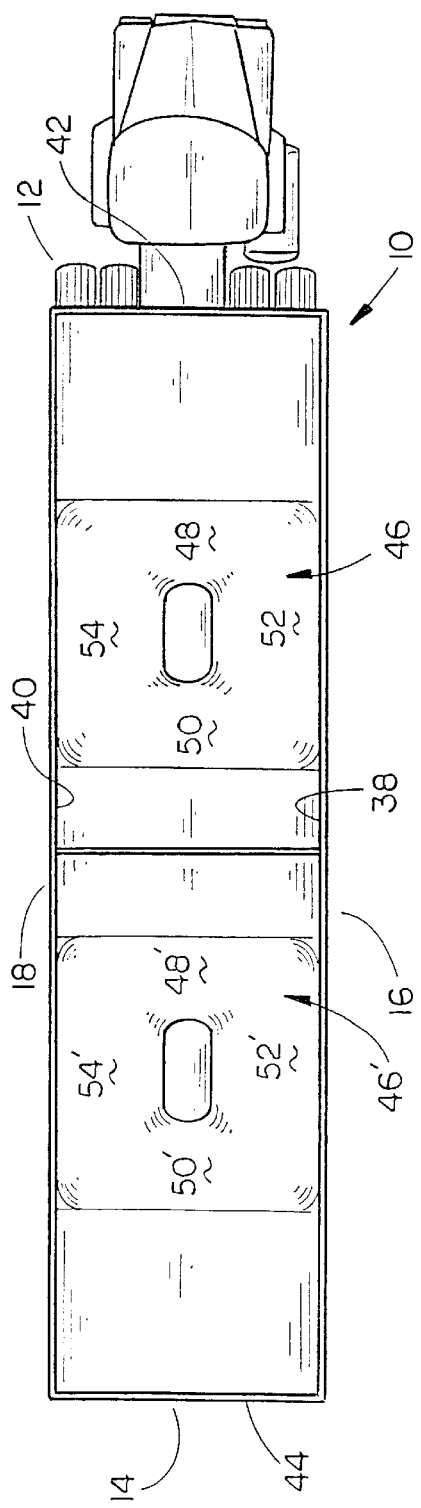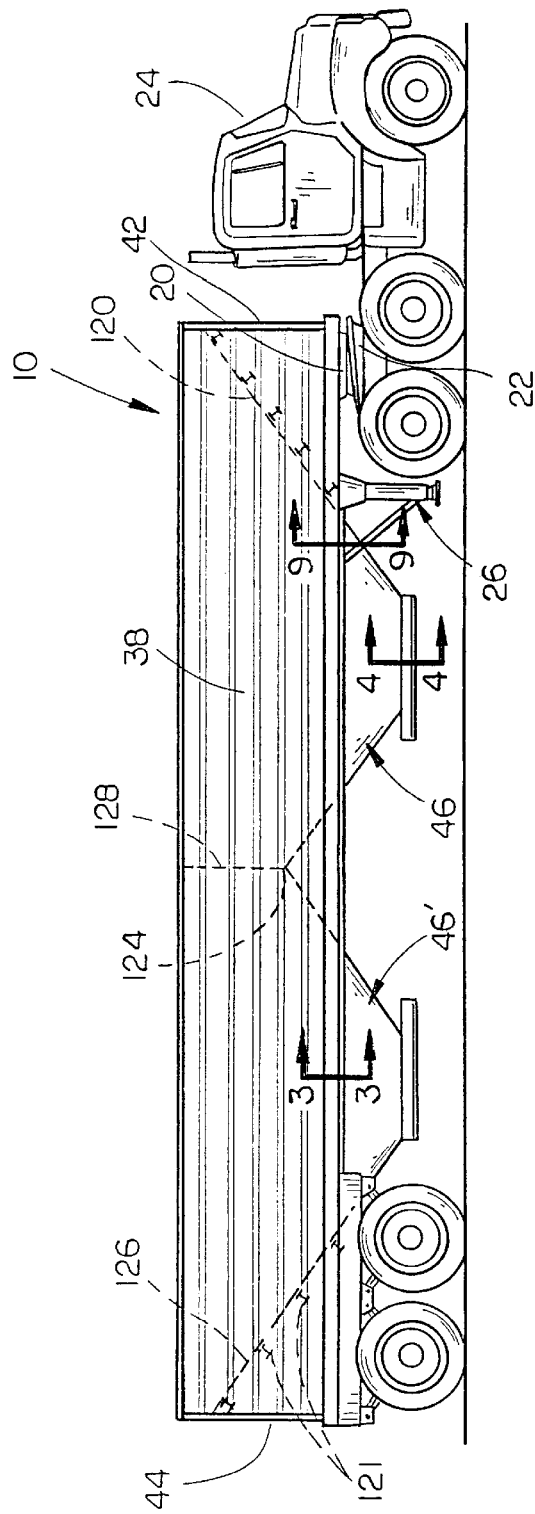

HOPPER BOTTOM TRAILER

BACKGROUND OF THE INVENTION

1. Field of the Invention

This invention relates to open top vessels such as tanks, bins and hoppers, other than round tanks, which may either stationary or as part of trucks, trailers, ocean shipping containers or other mobile conveyance, for storing, transporting or processing bulk materials and liquids. More specifically, this invention relates to vessels comprised of fiber reinforced plastic (FRP) wherein the high tension carrying capabilities of FRP are utilized to support and contain the bulk materials or liquids by means of a thin flexible FRP shell, supported along its upper sides and/or top edge by a frame consisting of FRP, steel, aluminum, or other materials. Even more specifically, the instant invention relates to a hopper bottom trailer wherein the hopper bottoms are constructed of thin, flexible FRP shells.

2. Description of the Related Art

The conventional method of constructing large open top vessels, other than round vessels, is to construct the shell or box consisting of flat sides and bottom in the form of a box, cone, trapezoid, or other shape necessary to contain and/or discharge the contained material or accomplish other intended purposes. The loads, lateral and vertical forces, exerted by the contained material on the flat walls and bottom of the vessel tend to cause the flat bottom and walls of the vessel to deflect and become convex in shape. If the loading is significant, the walls and bottom may buckle or rupture. To prevent buckling or rupturing, the walls and bottom of the vessel are constructed so as to be thick and/or rigid or are further reinforced with ribs, support beams or other supporting structure capable of resisting the forces applied by the material contained in the vessel. In either event, the walls and bottom and any supporting beams or ribs are subject to bending. When such vessels or containers are constructed of steel, the resultant structure requires significant labor to fabricate, is heavy, and is subject to corrosion. The weight of a steel structure is a disadvantage when being used on a truck, trailer or other mobile conveyance. When the vessel is made of aluminum, the structure also requires significant labor to fabricate and if the aluminum sheets are bolted or riveted together, seams, crevices and other protrusions are formed in the bottom and walls of the vessel that may leak, disrupt or impede the smooth flow of material from the vessel when it is used as a hopper or process vessel. When such vessels are made of FRP, which is lighter than steel or aluminum, but which often has a lower modulus of elasticity in bending than steel or other conventional material, the walls of the vessel must be made thicker, or the ribs or reinforcing beams must be made thicker and placed closer together to resist the bending forces to prevent unacceptable deflection.

The conventional method of manufacturing large open top vessels from FRP has the disadvantage of requiring thicker material to resist bending and the joining of many parts which requires substantial labor. Since FRP materials are usually more expensive than steel, the cost of manufacturing FRP vessels places them at a cost disadvantage with respect to steel and other conventional materials. On the other hand, FRP is more resistant to corrosion than steel and other conventional materials; and would be the material of choice for lightweight vessels and those containing liquids or corrosive materials if the disadvantages associated with its low modulus of elasticity could be overcome to reduce the amount of material required to lower the cost of producing such vessels.

Generally speaking, conventional hopper bottom trailers include one or more metal hopper bottoms having discharge openings at the lower ends thereof with the discharge openings normally being positioned between the wheels of the trailer. Normally, side walls extend upwardly from the hopper bottom to contain the material being transported and to direct the material being transported to the hopper bottom for discharge therefrom. Usually, the hopper bottoms are constructed of a steel or aluminum material with the hopper bottoms normally being constructed of sheets of metal which are bolted, welded or riveted together to form the cone-shaped hopper bottom which is necessary to direct the material being transported to the discharge opening. The construction of the hopper bottoms is time-consuming due to the need for connecting the various panels or segments together to form the hopper bottom.

SUMMARY OF THE INVENTION

The vessel of this invention is ideally suited for use in a hopper bottom trailer. A hopper trailer is described as including a wheeled frame means having a rearward end, a forward end, a pair of opposite sides and a pair of opposing sloped bottom members. The sides and ends of the trailer frame are normally vertical. The bottom members consist of flat plates reinforced with crossbeams extending between the two sides at the top edge at each end of the trailer frame and sloping downwardly toward the center of the trailer to the bottom edge of the side walls where the hopper bottoms of this invention are connected to the underside of the frame side walls and the interior edge of the sloped bottom members. Bulk materials are contained in the trailer by the side walls and the sloped bottom of the trailer, where it is directed to the hopper bottom of this invention. The hopper bottoms serve to further contain the material in the trailer for storage and shipment and provide a means of discharging the material from the trailer by gravity through a slide gate or the like located in the bottom of the hopper bottom.

The hopper bottom vessel of this invention consists of a bottom with an oval, elliptical or round opening closed by a slide gate or the like and side walls which, for the approximate first third of the total height of the hopper, radiate outward and upward from the opening at an angle most appropriate for the smooth flow of material from the hopper, approximately 33° or more from horizontal. The shape of the upper two-thirds of the hopper walls are curved to transfer the loads imposed by the materials contained in the hopper to the side walls of the trailer frame in such a manner that the horizontal forces imposed on the side wall frame by the contained material are kept to a minimum. The end walls of the hoppers, in addition to transferring the contained loads to the side walls, further serve to intercept and direct the material from the flat slopes of the trailer bottom into the hopper for discharge through the oval opening. The unique upper edges of the side walls of the hopper bottoms are formed into an inverted U-shaped frame attachment member extending along the bottom edge of each trailer side wall. The upper edge of each end wall of the hopper bottoms are supported by uniquely shaping the upper edge of the end walls of the hopper bottom into an integrally molded crossbeam and trailer jack leg attachment member. Each of the hopper bottoms is constructed of a lightweight fiber reinforced plastic material with the preferred fibers being glass or carbon.

Briefly stated, the present invention consists of a vessel constructed of FRP. More particularly, the present invention consists of a hopper bottom for a hopper bottom trailer with the hopper bottom being constructed of FRP. The hopper bottom is manufactured in a single molding operation with no or minimal additional parts to assemble. In plan view, the hopper bottom along its upper edge is generally rectangular with straight sides and curved or straight ends. The side walls and bottom of the hopper bottom are constructed of a thin flexible FRP skin shaped to conform to the loads applied by the contained material and to accommodate the discharge of material through a bottom drain or other device. In general, the bottom and the walls of the hopper bottom are curved. They are shaped to maximize the high tensile strength and flexibility of FRP without the need of strengthening ribs or other supporting members.

The forces exerted by the load contained in the hopper bottom are carried by tension in the thin shell (wall and bottom) of the hopper bottom which is allowed to deflect when loaded to accomplish this purpose. The shell of the hopper bottom and cross-section is approximately U-shaped or hemi-ellipsoidal in shape throughout a large portion of the hopper bottom except where altered to accommodate discharge hoppers and/or drains and the flat intercepting end slopes of the trailer bottom members or such other process requirements of the vessel. The hopper bottom and its contents are supported along the upper edge of the vessel by attaching the shell to a supporting frame which may be molded into the hopper bottom during the molding process or separately secured to the upper edge of hopper bottom.

A feature of the invention is the means of attaching the thin shell to the supporting frame by extending the upper edge of the shell side walls over the top of an inverted U-shaped frame attachment member to provide for a positive physical connection and uniform distribution of stress throughout the top edge of the hopper side walls. The thin FRP shell requires minimal, or no additional thickening at the U-shaped connecting edge.

Another feature of the invention is the means of molding a supporting crossbeam member into the upper edge of the ends of the vessel to provide a structural transition from the thin shell elastic shape of the vessel to the flat rigid sloped bottom of the trailer frame and bottom assembly. The molded upper edge crossbeams of the end walls are an integral part of the trailer frame extending between the lower edge of the trailer side walls frames, rigidly securing the opposing side walls in place, eliminating the need for the separate heavy structural members and bracing and simultaneously providing the structural support member for securing the trailer jack leg assembly in front of the trailer and the rear trailer wheel truck assembly in the rear and additional reinforcing between hoppers on a multi-hopper trailer.

Yet another feature of the invention is the oval or round discharge opening and the means of attaching a rectangular slide gate to such opening. The oval opening is encircled with numerous continuous strands of glass or carbon reinforcing to create a tension ring around the opening and avoid or prevent excessive deformation of the opening under load. The oval opening is encompassed in an integrally molded, rectangular frame to which the slide gate or trap support frame is attached.

Still another feature of the invention is the unique behavior of the thin elastic FRP vessel shell walls and bottom. When the hopper trap door or slide gate is closed, and the hopper bottom trailer is full of material, the vessel shell walls and bottom deflect and assume the most effective shape to carry the loads exerted by the material in tension. As material is discharged through the trap opening in the bottom and the load reduces, the stress on the shell walls is relieved and the elastic walls regain the most optimum shape or slope for discharging the remaining material.

It is therefore a principal object of the invention to provide an improved vessel for containing, transporting and/or processing bulk and fluid materials.

Yet another object of the invention is to provide an improved vessel wherein the vessel is constructed of fiber reinforced plastic material (FRP).

Still another object of the invention is to provide a vessel that is rectangular in plan view and which is lightweight and can be mounted to a trailer for transporting bulk material.

Still another object of the invention is to provide a vessel that functions well as a hopper or the hopper bottom of a truck or trailer.

Still another object of the invention is to provide a vessel that serves as a process vessel.

Yet another object of the invention is to provide an efficient means of attaching the hopper bottom to a supporting frame.

Still another object of the invention is to provide an integral trailer frame member molded in the top edge of the vessel at the ends of the vessel to provide a means for securing the support jack legs, inter-hopper connecting pieces and wheels of the hopper trailer to the hopper frame, and integrating the entire assembly into a single unit.

Still another object of the invention is to provide a means of attaching a hopper slide gate, trap or drain in the vessel bottom to discharge material from the vessel.

Still another object of the invention is to provide an opening in the bottom of the hopper which will not only facilitate the flow of material from the hopper, but which is large enough to do so and will not distort under load.

Still another object of the invention is to provide elastic side walls in the vessel that will conform to the applied loads when full and re-form to define slopes when the loads are decreased to maximize the discharge of residual material therefrom.

Still another object of the invention is to provide a smooth curved wall, seamless vessel without interior bolts, rivets, attachment plates or other obstructions to the smooth and efficient flow of material through the hopper bottom;

Still another object of the invention is to provide a hopper bottom vessel of such shape that when attached to the trailer frame, it will minimize or balance the lateral forces of the side walls of the trailer.

Still another object of the invention is to provide a vessel that is easy to fabricate.

Still another object of the invention is to provide a vessel or hopper bottom that is easy to install as a part of a hopper bottom trailer or other process equipment.

These and other objects will be apparent to those skilled in the art.

BRIEF DESCRIPTION OF THE DRAWINGS

FIG. 1 is a top view of the hopper bottom trailer of this invention;

FIG. 2 is a side elevational view of the hopper trailer of this invention;

DESCRIPTION OF THE PREFERRED EMBODIMENT

Figure 4:
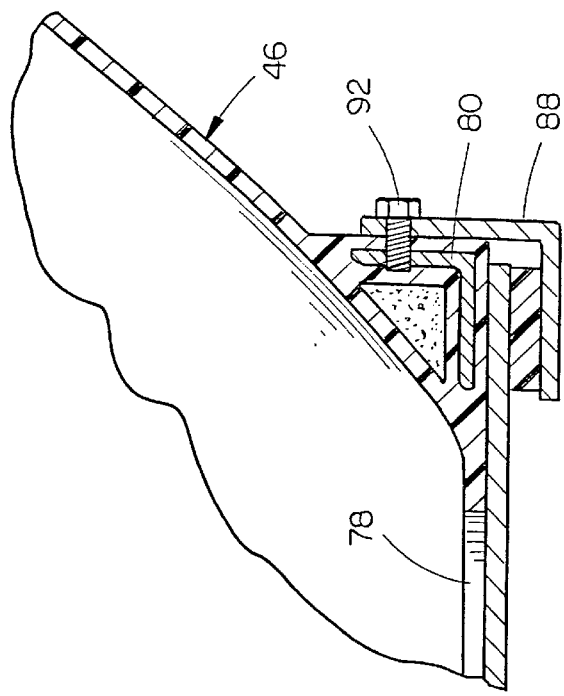
FIG. 4 is an enlarged sectional view as seen on lines 4-4 of FIG. 2.

In the drawings, the numeral 10 refers generally to a hopper bottom trailer having a forward end 12, rearward end 14 and opposite sides 16 and 18. Trailer 10 includes a kingpin structure 20 at its forward end which is adapted to be connected to the fifth wheel 22 of a truck 24. Trailer 10 also includes a jack assembly 26 at its lower forward end which is adapted to support the forward end of the trailer when the trailer is disconnected from the truck 24. Jack assembly 26 includes a pair of conventional jack members 28 and 30 having support plates 32 and 34 at the upper end thereof, respectively. Jack assembly 26 also includes a plurality of support arms 35 extending therefrom for connection to the trailer or to the frame thereof. Further, trailer 10 includes a pair of unique inverted U-shaped hopper bottom attachment members 37 at opposite sides thereof which extend most of or in some cases the entire length of the trailer and are riveted or bolted to the lower rails 102 of the trailer side walls 38 and 40. Vertically extending walls 38 and 40 extend upwardly from the side wall frame lower rails 102 on each side of the trailer and which side walls may be of monocoque construction and constitute both the longitudinal frame members and the material containment side walls. Front and rear walls 42 and 44, which extend between side walls 38 and 40 at each end of the trailer 10, form a box-shaped structure. A pair of sloped bottom members 120 and 126 extend downwardly at a slope from the top edge of each end wall 42 and 44 toward the center of the trailer to the bottom edge of the frame and side walls 38 and 40 and which said bottom members are supported and reinforced by a plurality of crossbeams 121 extending between side walls 38 and 40. Bottom members 120 and 126 slope at an angle conducive to the flow of bulk materials down the slope to the hopper bottoms. A pair of hopper bottoms 46 and 46' are provided on the trailer, as will be described in more detail hereinafter. Although a pair of hopper bottoms are illustrated, any number of hopper bottoms may be utilized. An inverted Y-shaped apex 124 extends between side walls 42 and 44 and connects the inwardmost ends of the two hopper bottoms 46 and 46' to each other and to a center dividing wall 128 extending upwardly from the upper leg of the apex 124 to the upper edge of the side walls 42 and 44 and extending between side walls 42 and 44 to partition the trailer into two sections. As stated, although the drawings illustrate that a pair of hopper bottoms 46 and 46' are utilized, it should be noted that the number of hopper bottoms will vary with the size of the trailer. Further, although it is described that the hopper bottoms of this invention are utilized on a trailer, it should be understood that the hopper bottoms would also function satisfactorily on a truck body. While the elements 46 and 46' are shown as being a hopper bottom, they are generally open top vessels and could be an open top tank, bin or hopper for stationary use or as parts of ocean shipping containers or other mobile conveyance, for storing, transporting or processing bulk material or liquids and could extend upwardly a greater distance than shown in the drawings and comprise a larger portion of the entire trailer than is presently shown. The hopper bottoms or vessels are comprised of FRP to utilize the high tension carrying capabilities of FRP to support and contain the material by means of a thin flexible FRP shell supported along its upper sides and/or top edge, as will be described hereinafter.

Figure 9:
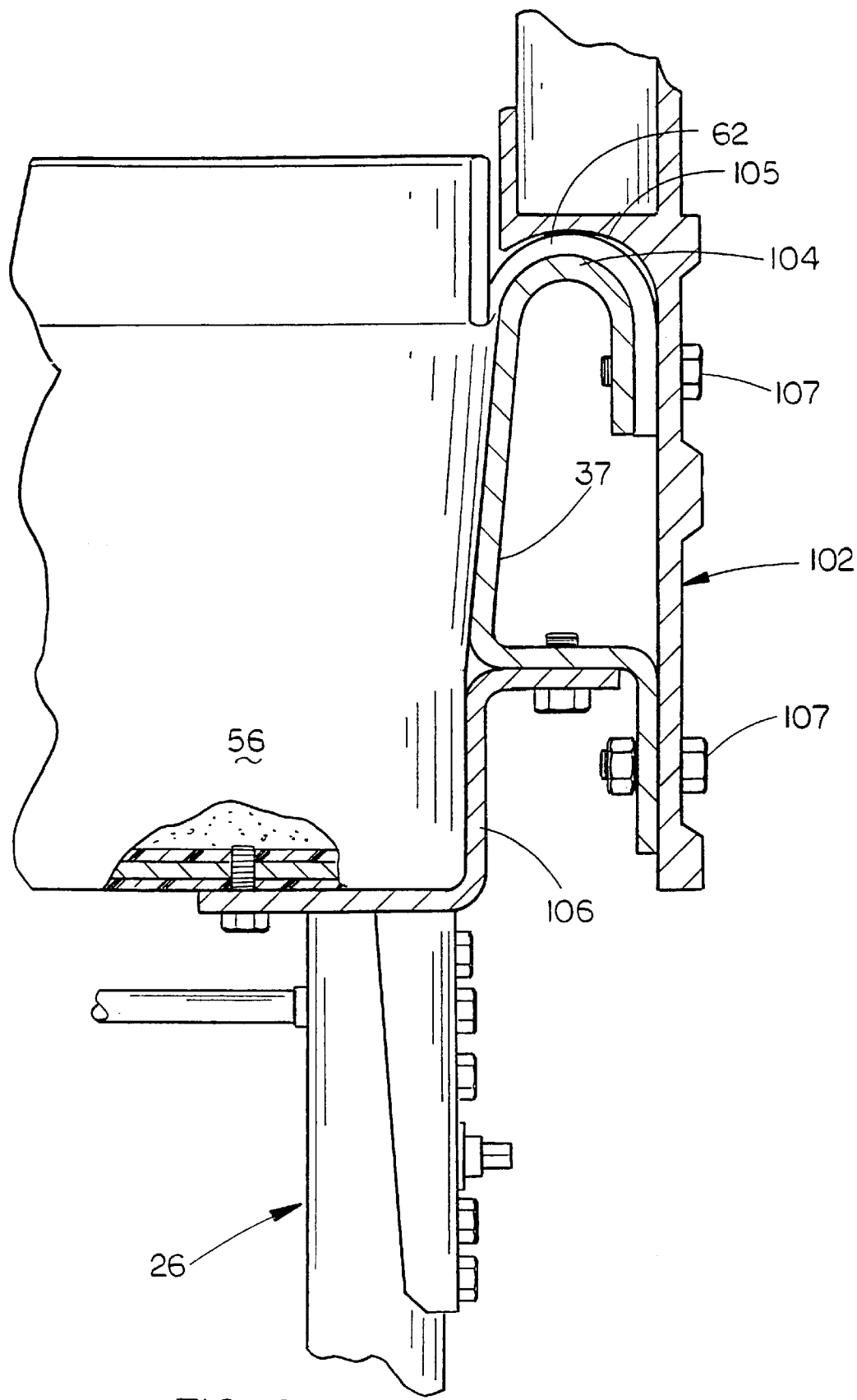
FIG. 9 is a partial vertical sectional view illustrating the manner in which the side of a hopper bottom is secured to the trailer support frame.

Inasmuch as each of the hopper bottoms 46 and 46' are identical, only hopper bottom 46 will be described in detail with "'" indicating identical structure on hopper bottom 46'. Hopper bottom 46 includes a forward wall 48, rearward wall 50, and opposite side walls 52 and 54. As shown in the drawings, the hopper 46 is symmetrical about its transverse and longitudinal center lines, but need not be so in all cases. Generally speaking, hopper bottom 46 defines an oval, elliptical, round or similar shaped opening 78 and its arcuate end and side walls extend upwardly and outwardly from opening 78. Hopper bottom side walls 52 and 54 curve outwardly and upwardly from opening 78 to their inverted U-shaped upper ends 60 and 62 at which point they extend upwardly and over the inverted U-shaped supporting frame attachment members 37 and 37' and are adhesively attached to supporting frame members 37 and 37'. The assembly consisting of the inverted "U" members 60 and 62 and members 37 and 37' are then bolted to the lower rail side wall frame member 102 by bolts 107 (FIG. 9).

The end walls 48 and 50 of hopper 46 extend upwardly and outwardly from the opening 78 in a curved or arcuate fashion, as seen in the drawings. The flat upper edges of the end walls 48 and 50 are the same angle and lie in the same general plane as the sloped trailer bottom members 120 and 126 and are adhesively and mechanically joined to the trailer bottom members 120 and 126 and the apex 124. The flat sloped edges of the end walls extend between the two U-shaped portions 60 and 62 at opposite sides of the hopper. The plan view of the upper edges of the hopper, as defined by the side walls and end wall edges 60, 62, 64 and 66, is rectangular.

Figure 6:
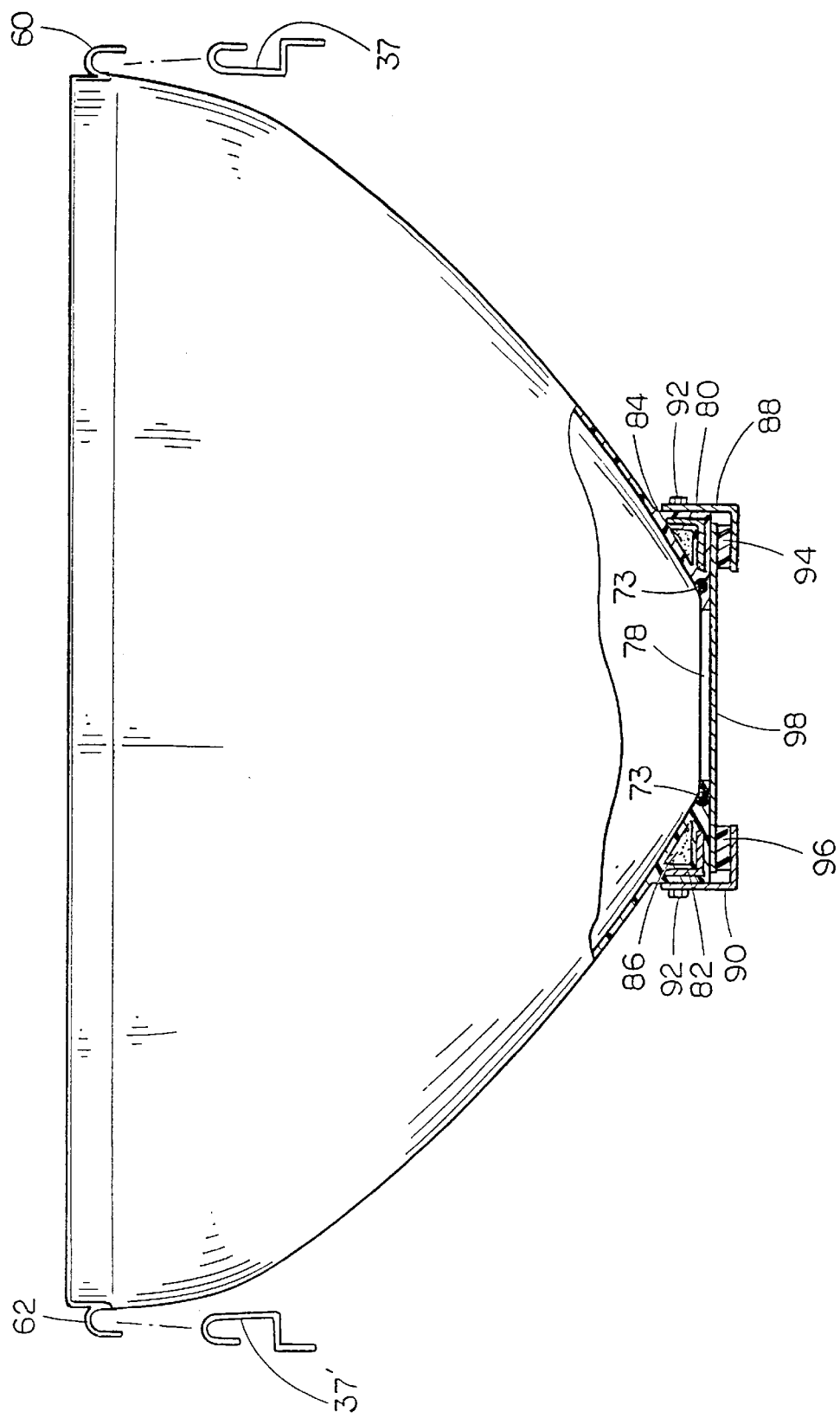
FIG. 6 is an end view of one of the hopper bottoms of this invention with portions thereof cut away to more fully illustrate the invention.
Figure 7:
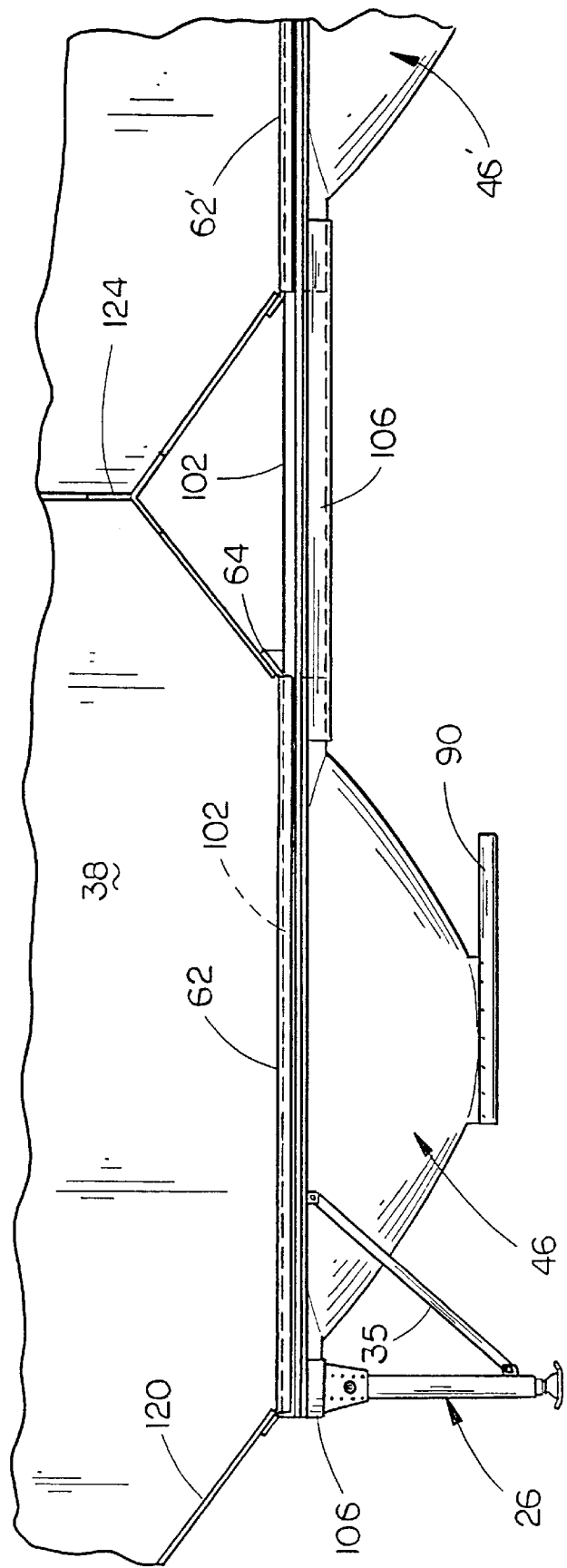
FIG. 7 is a partial side elevational view of the hopper bottom trailer of this invention.

As seen in the drawings, hopper bottom 46 has a generally elliptical cross-section shape except at the hopper opening 78 and has a convex configuration as viewed from the exterior thereof. The lower ends of walls 48, 50, 52 and 54 terminate in discharge opening 78, as previously described, which is surrounded by slide gate support structure 76. Elongated metal angle members 80 and 82 are embedded in discharge opening support structure 76 at opposite sides of the opening 78, as illustrated in FIG. 6. Preferably, triangular-shaped members 84 and 86 are also provided in the cavity created by the side walls and bottom of shown support 76 and the intersection of the side and end walls of hopper bottom 46 and structure 76 for strengthening purposes and are comprised of a structural foam material such as polyurethane. Angle brackets 88 and 90 are secured to opposite sides of structure 76 by bolts 92 which are drilled and tapped into the angle brackets 80 and 82, as seen in FIG. 6, and have Teflon strips or strips of a similar material 94 and 96 mounted thereon, respectively, upon which is slidably mounted a gate 98 adapted to selectively close the discharge opening 78. Gate 98 is conventionally moved by means of a crank assembly 100. The load carried on slide gate 98 is transferred to angle brackets 88 and 90 and then to bolts 92 and then to metal angle members 80 and 82 which uniformly distribute the slide gate load to the sides of the discharge opening support structure 76. This method of supporting and securing the slide gate and its frame allows for the easy installation and repair of the slide gate frame and mechanism if damaged during use and provides an exceptionally strong structure with considerable weight savings over conventional methods. Angle brackets 88 and 90 have Teflon strips or other similar material 94 and 96 mounted thereon, respectively, upon which is mounted the gate 98 which is adapted to selectively close the discharge opening 78.

Figure 3:
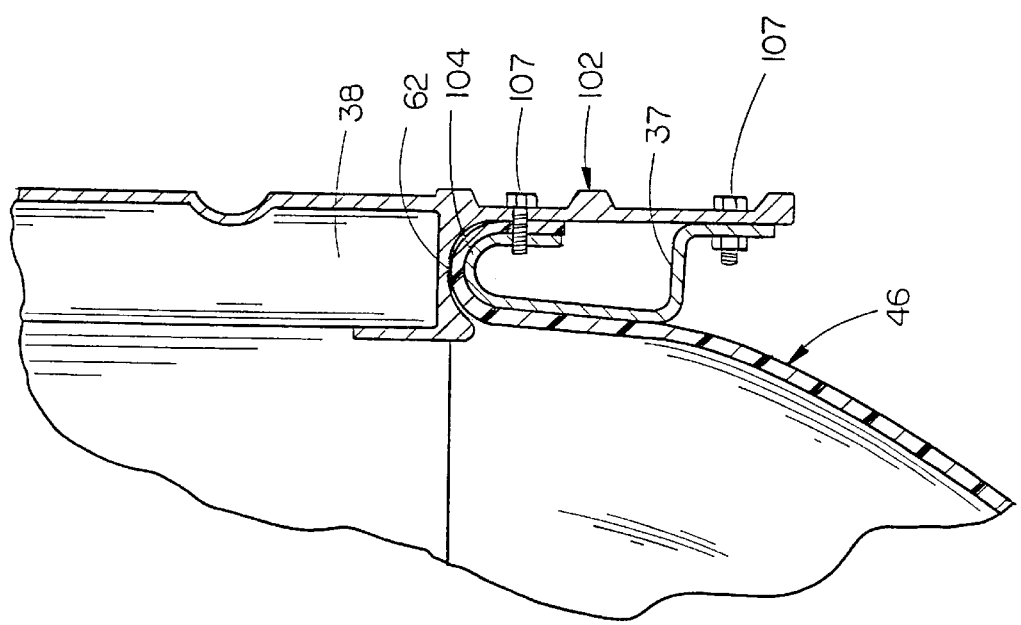
FIG. 3 is an enlarged sectional view as seen on lines 3-3 of FIG. 2.
Figure 5:
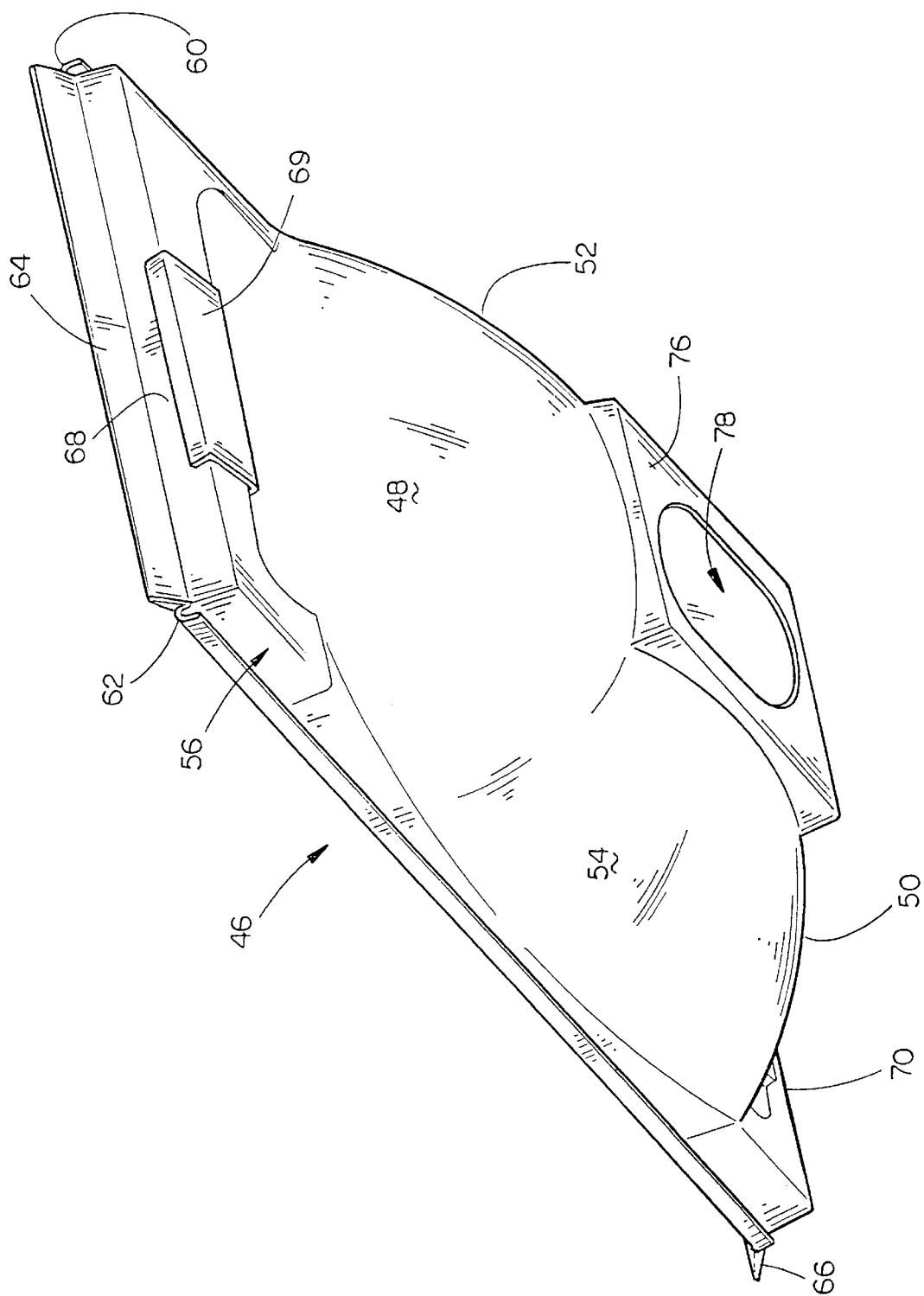
FIG. 5 is a bottom perspective view of one of the hopper bottoms of this invention.
Figure 8:
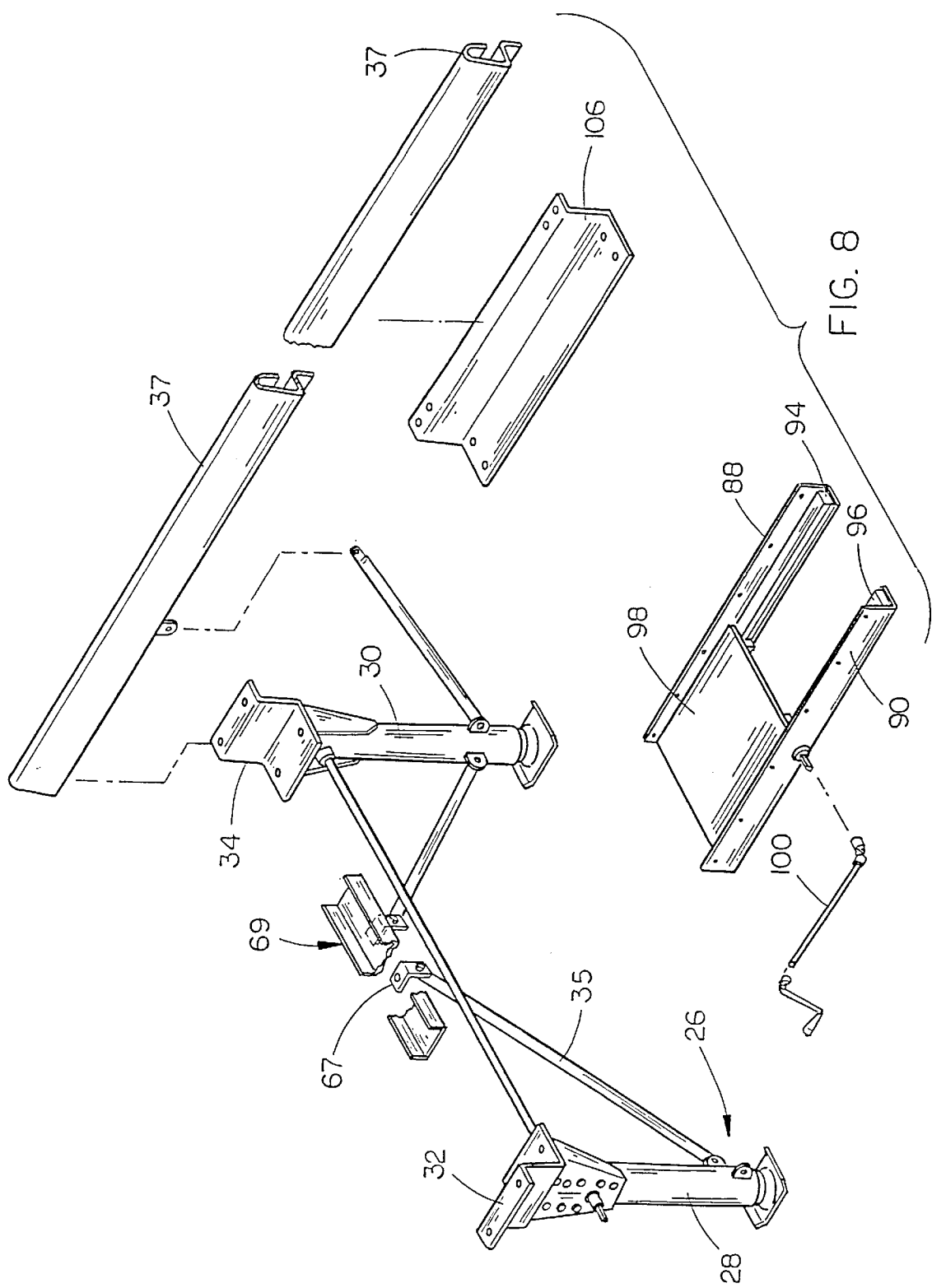
FIG. 8 is an exploded perspective view of portions of the supporting frame and discharge opening structure.

The side wall frame attachment member 37 is bolted to frame member 102, as illustrated in FIG. 3, at one side of hopper 46 and is provided with an inverted U-shaped portion 104 at the upper end thereof. As seen in FIG. 3, U-shaped support 62 is positioned over U-shaped portion 104 and is maintained therein by adhesive. U-shaped portion 62 is received by the inverted U-shaped portion 105 of frame member 102. Hopper bottom 46 is secured to the trailer side wall frame member 102 by bolting or riveting (bolts 107 are shown) the assembly of hopper bottom 46 and member 37 to lower rail 102. Similarly, U-shaped support 102' is mounted at the other side of the trailer in the same fashion as support 102 is mounted on support 106. Preferably, crossbeams 68 and 70 are molded into the upper edge ends of hopper 46 which extend between the U-shaped supports 60 and 62 at the rearward and forward ends of hopper 46 and at the rearward and forward ends of hopper 46'. An elongated Z-shaped bracket 106 is secured to and extends from the supports 37 and is adhesively and/or mechanically secured thereto at one side of the trailer, as illustrated in FIG. 9. A bracket identical to bracket 106 is provided at the other side of the hopper bottom 46 and 46'. As seen in FIG. 9, the bracket 106 is bolted to the support 37 and is adhesively secured and/or bolted to side support 56. C-channel member 69 is adhesively secured to crossbeam 70 at the rear end of the rearwardmost hopper bottom and the front end of the forwardmost hopper bottom to which the rear trailer wheel frame is attached by welding or bolting and the jack assembly support arms 35 are attached via a weld clip 67 to C-channel member 69, as shown in FIG. 8.

Sloped trailer bottom members 120 and 126 extend upwardly from the upper opposing ends of hoppers 46 and 46'. Apex 124 joins the two inboard ends of hoppers 46 and 46'and are connected to an upstanding wall 128.

Figure 10:
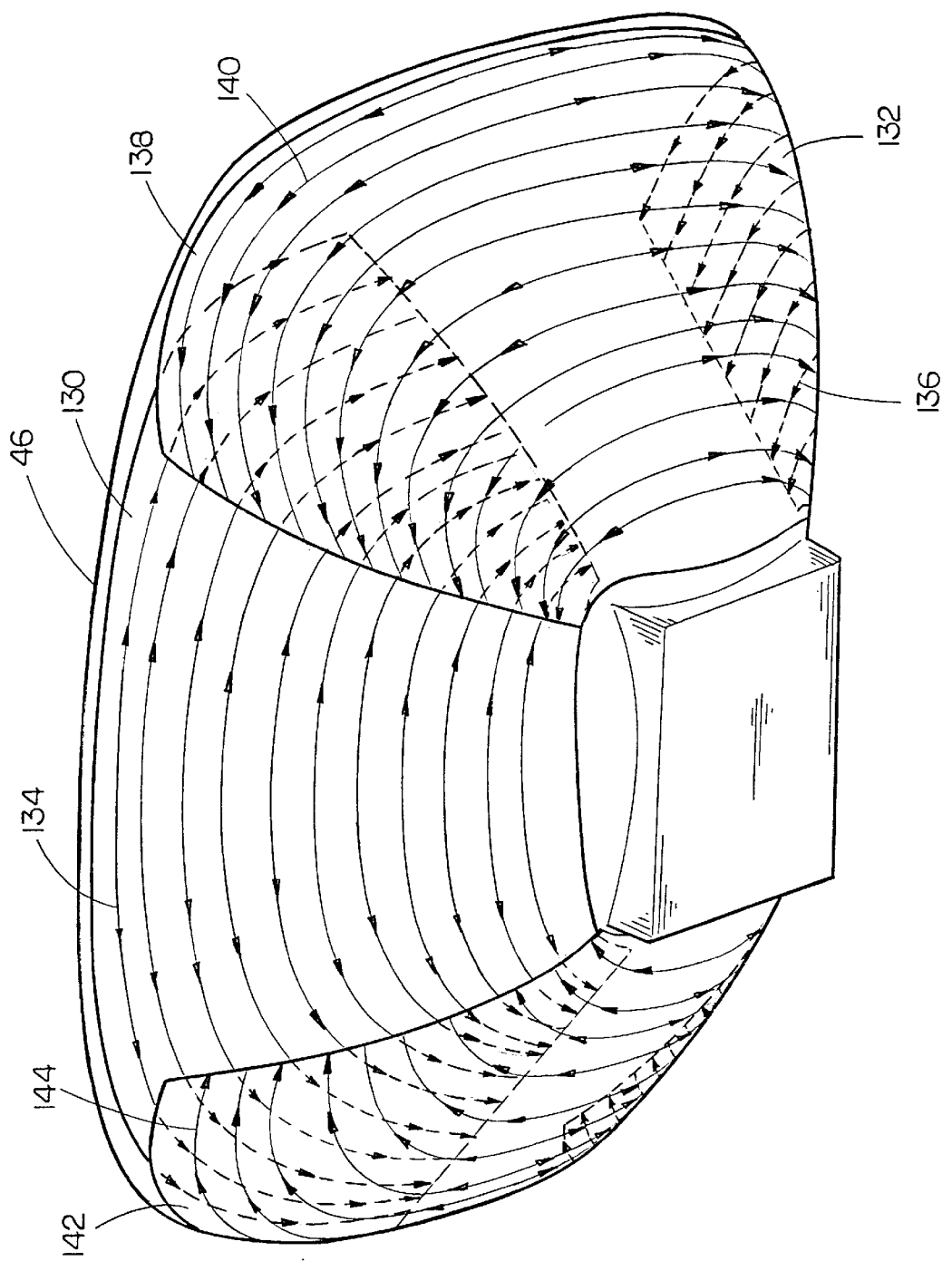
FIG. 10 is a bottom perspective view of one of the hopper bottoms of this invention illustrating the manner in which the fiber sheets are overlapped with the arrows indicating the alignment of the horizontal fibers in the overlapped sheets. The shell is also reinforced with fibers running normal to the horizontal fibers, but not shown.

Each of the hoppers 46 and 46' are formed of a thin shell FRP. The fibers may be glass or other fibers such as carbon. The hopper 46 is formed by placing one or more thin sheets of glass reinforcing material, preferably with glass fibers oriented in the 0° and 90' direction from the longitudinal axis of the glass reinforcement sheet and with random glass fibers stitched thereto on each side of a male mold in the shape of the interior of hopper 46, as illustrated in FIG. 10. The numerals 130 and 132 in FIG. 10 refer to the sheets of fiber reinforcement which are positioned at each side of the hopper 46 with the arrows 134 and 136 in FIG. 10 indicating the direction or orientation of the 0° fibers in the sheets 130 and 132. A sheet of glass reinforcement referred to generally by the reference numeral 138 is then placed over the forward end of the male mold for the hopper being formed in the manner illustrated in FIG. 10 and with the arrows 140 indicating the direction or orientation of the 0° fibers in sheet 138. Similarly, a sheet 142 of the FRP material is placed over the other end of the hopper being formed with the arrows 144 indicating the direction or orientation of the 0° fibers in the sheet 142. The overlapping of the sheets 140 and 142 with respect to the sheets 130 and 132 causes the orientation of the fibers in those sheets to intersect, as illustrated in FIG. 10, which gives additional strength to the hopper upon forming. The width of the overlap and the number of layers of such sheets of reinforcing glass fibers may vary, depending on the strength required. Not shown are the fibers in the 90° direction which provide the strength to the thin shell in the vertical direction and carry the majority of the material weight in the vertical direction while the fibers oriented in the direction shown primarily carry the loads exerted by the material in the hopper in the horizontal direction. Note that while this description indicates reinforcing fibers in the 0° and 90° direction the fiber orientations such as 45° and 45° or otherwise may also be used. A structural foam core with metal reinforcement angles or plates is encased in the glass fiber reinforcement for the structural crossbeams, jack leg support and slide gate frame support. The oval opening in the hopper bottom and slide gate frame support is encircled by tension ring 73 consisting of a bundle of continuous glass fiber reinforcing strands that tie the 0° and 90° glass reinforcing sheets in position at the perimeter of the opening 78 to create an exceptionally strong, lightweight opening frame. The hopper is then completed by placing an outer mold in the shape of the exterior surface of the hopper which also includes the shape necessary for the crossbeams at the ends of the hopper, the jack leg support and the slide gate frame support, over the entire inner hopper mold and fiber reinforcement material and injecting resin in the cavity containing the reinforcement between the two mold surfaces in any of several different conventional methods, the material and resin are cured in the conventional fashion and demolded to obtain the completed one-piece hopper bottom, including the slide gate support, two trailer cross frame support members and four jack leg or connecting bracket support members.

In use, the forces exerted by the load contained in the vessel or hopper bottom are carried by tension in the thin shell (wall and bottom) of the hopper bottom which is allowed to deflect and conform to such shape that the loads imposed on the vessel by the contained material dictate as they are transferred into the thin shell walls of the vessel and supported by the high tensile carrying capacity of the fiber reinforced plastic walls which in turn transfer the load to the trailer wall support frame in such a manner that the horizontal forces imposed on the trailer side wall frames are kept to a minimum. This is all accomplished with the thin shell vessel walls eliminating the need for additionally thick materials or beam or rib reinforcement to support the loads. This vastly reduces the weight of the vessel, improves the flow of material during discharge and simplifies the fabrication or construction of the vessel. The shell of the hopper bottom in cross-section is approximately U-shaped or hemi-ellipsoidal throughout a large portion of the hopper bottom except where it is altered to accommodate the discharge slide gate or the like and to accommodate the transition to trailer bottom members and flat slopes at the ends of the hoppers. The hopper bottom and its contents are supported along the upper edge of the hopper bottom, as illustrated in the drawings. Attaching the thin shell of the hopper bottom to the supporting frame by extending the shell over the top of the inverted U-shaped frame and adhesively securing the shell to the frame provides for a positive physical connection and uniform distribution of stress throughout the top edge of the hopper bottom. The design of the hopper bottom is such that when the hopper discharge opening is closed and the hopper bottom is full, the hopper bottom shell deflects to carry the load in tension. As the load is discharged through the discharge opening, the stress on the shell walls is relieved and the elastic walls regain the most optimum shape or slope for discharging the remaining material.

The design of the hopper bottom shape is such that at the center of the hopper, the side walls extend upwardly and outwardly to the upper edge where they are curved upwardly at a near vertical position. This shape which supports the material loads within the hopper through tension in the thin shell walls (which at this point are near vertical) produces minimal horizontal force on the side wall of the trailer frame. This produces a lower horizontal moment in the lower rail of the trailer side wall frame than conventional construction and allows for the use of a lighter weight lower rail member for additional weight savings.

Thus it can be seen that a unique vessel such as a hopper bottom has been provided which accomplishes at least all of its stated objectives.

What is claimed is:

1. A bulk material transporting hopper trailer, comprising:

a wheeled frame means having a rearward end, a forward end, at least a pair of opposite side wall members, and at least a pair of end wall members extending downward toward the center of the trailer;

at least one hopper bottom mounted on said wheeled frame means below said side wall members and said end wall members for discharge of materials;

said hopper bottom having end walls and side walls extending downwardly and inwardly from the lower ends of said end wall members and said side wall members wherein upper ends of said side walls of said hopper bottom have an inverted U-shaped support member which is secured to a U-shaped support frame attaching member in said wheeled frame means;

said hopper bottom defining a discharge opening at the lower end thereof;

said side walls and end walls of said hopper bottom being shaped such that they direct the flow of said materials by gravity into said discharge opening; and said hopper bottom being comprised of a fiber reinforced plastic material.

2. The bulk material transporting trailer of claim 1, wherein each of said walls of said hopper bottom is curved.

3. The bulk material transporting trailer of claim 1, wherein each of said walls of said hopper bottom is convex.

4. The bulk material transporting trailer of claim 1, wherein, for a first portion of said hopper bottom, each of said walls of said hopper bottom radiates outward and upward in straight line radius from said discharge opening at an angle suitable for smooth flow of said material from said hopper bottom, and, for a second portion of said hopper bottom, each of said walls of said hopper bottom is curved for transferring loads imposed by said materials contained in said hopper bottom to said side wall members of said wheeled frame means.

5. The bulk material transporting trailer of claim 6, wherein said first portion of said hopper bottom comprises approximately the lower one third of the total height of said hopper bottom, and said second portion of said hopper bottom comprises approximately the upper two-thirds of the total height of said hopper bottom.

6. The bulk material transporting trailer of claim 5, wherein said angle of said first portion is approximately thirty-three degrees.

7. The bulk material transporting trailer of claim 1, wherein said side walls of said hopper bottom approach vertical adjacent to said inverted U-shaped support member.

8. A bulk material transporting hopper trailer, comprising:

a wheeled frame means having a rearward end, a forward end, at least a pair of opposite side wall members, and at least a pair of end wall members extending downward toward the center of the trailer;

at least one hopper bottom mounted on said wheeled frame means below said side wall members and said end wall members for discharge of materials;

said hopper bottom having end walls and side walls extending downwardly and inwardly from the lower ends of said end wall members and said side wall members;

said hopper bottom defining a discharge opening at the lower end thereof;

said side walls and end walls of said hopper bottom being shaped such that they direct the flow of said materials by gravity into said discharge opening;

said discharge opening being framed by an integrally molded rectangular-shaped reinforcing structure for securing a slide gate frame adjacent said discharge opening; and said hopper bottom being comprised of a fiber reinforced plastic material.

9. The bulk material transporting trailer of claim 8, wherein said rectangular-shaped reinforcing structure comprises a core formed of structural foam encased in said fiber reinforced plastic.

10. The bulk material transporting trailer of claim 9, wherein said rectangular-shaped reinforcing structure has elongated, horizontally disposed reinforcing members embedded therein.

11. The bulk material transporting trailer of claim 9, wherein said discharge opening is one of oval, elliptical, and circular shaped.

12. The bulk material transporting trailer of claim 9, wherein said discharge opening is encircled by a tension ring.

13. The bulk material transporting trailer of claim 12, wherein said tension ring comprises a bundle of fiber reinforcing strands.

14. A bulk material transporting hopper trailer, comprising:

a wheeled frame means having a rearward end, a forward end, a pair of opposite side wall members, and a pair of end wall members, and at least one hopper bottom mounted on said wheeled frame means and having a discharge opening formed therein for the discharge of materials;

said hopper bottom having end walls and side walls extending downwardly and inwardly from the lower ends of said end wall members and said side wall members;

a closure means selectively closing said discharge opening;

said hopper bottom end walls and side walls joining said end wall members and side wall members of said frame means, respectively, wherein upper ends of said side walls of said hopper bottom have an inverted U-shaped support member which is secured to a U-shaped support frame attaching member on said wheeled frame means; and said side walls and end walls of said hopper bottom being shaped such that their lower portions direct the flow of said materials by gravity into said discharge opening so as to be suitable for providing smooth flow of said material from said hopper bottom.

15. The bulk material transporting trailer of claim 14, wherein said hopper bottom is constructed of a fiber reinforced plastic material.

16. The bulk material transporting trailer of claim 14, wherein said end walls of said hopper bottom have upper ends which have an integrally molded crossbeam therein.

17. The bulk material transporting trailer of claim 16, further comprising an attachment member integrally molded into each end of said crossbeam.

18. The bulk material transporting trailer of claim 17, further comprising a bracket for attaching said attachment member and said side wall member and for attaching a jack leg assembly to said wheeled frame means.

19. The bulk material transporting trailer of claim 18, wherein a C-shaped channel is secured to said crossbeam for attachment of a jack assembly support arm.

20. A bulk material transporting hopper trailer, comprising:
a wheeled frame means having a rearward end, a forward end, a pair of opposite side wall members, and a pair of end wall members, and at least one hopper bottom mounted on said wheeled frame means and having a discharge opening formed therein for the discharge of materials;
a closure means selectively closing said discharge opening;
said hopper bottom having end walls and side walls radiating and extending outwardly and upwardly from said discharge opening to a generally rectangular top opening;
said discharge opening defining an oval shape wherein said discharge opening is framed by an integrally molded rectangular-shaped reinforcing frame for securing a slide gate frame thereto;
said hopper bottom end walls and side walls joining said end wall members and side wall members of said frame means, respectively; and
said side walls and end walls of said hopper bottom being shaped such that their lower portions direct the flow of said materials by gravity into said discharge opening so as to be suitable for providing smooth flow of said material from said hopper bottom.

21. The bulk material transporting trailer of claim 20, wherein, for a first portion of said hopper bottom, each of said walls of said hopper bottom radiates outward and upward from said discharge opening at an angle suitable for smooth flow of said material from said hopper bottom, and, for a second portion of said hopper bottom, each of said walls of said hopper bottom is curved for transferring loads imposed by said materials contained in said hopper bottom to said side wall members of said wheeled frame means.

22. The bulk material transporting trailer of claim 21, wherein said first portion of said hopper bottom comprises approximately the lower one third of the total height of said hopper bottom, and said second portion of said hopper bottom comprises approximately the upper two-thirds of the total height of said hopper bottom.

23. The bulk material transporting trailer of claim 22, wherein said angle of said first portion is approximately thirty-three degrees.

24. The bulk material transporting trailer of claim 21, wherein upper ends of said side walls of said hopper bottom have an inverted U-shaped support member which is secured to a U-shaped support frame attaching member on said wheeled frame means.

25. The bulk material transporting trailer of claim 24, wherein for a third portion of said hopper bottom adjacent to said inverted U-shaped support member said side walls approach vertical.

26. A bulk material transporting hopper trailer, comprising:
a wheeled frame means having a rearward end, a forward end, a pair of opposite side wall members, and a pair of end wall members, and at least one hopper bottom mounted on said wheeled frame means and having a discharge opening formed therein for the discharge of materials;
a closure means selectively closing said discharge opening;
said hopper bottom having end walls and side walls radiating and extending outwardly and upwardly from said discharge opening to a generally rectangular top opening;
said hopper bottom end walls and side walls joining said end wall members and side wall members of said frame means, respectively;
said end walls of said hopper bottom having upper ends which have an integrally molded crossbeam therein;
said side walls and end walls of said hopper bottom being shaped such that their lower portions direct the flow of said materials by gravity into said discharge opening so as to be suitable for providing smooth flow of said material from said hopper bottom; and
said hopper bottom being constructed of a fiber reinforced plastic material.

27. The bulk material transporting trailer of claim 26, wherein said at least one hopper bottom includes a forward hopper bottom and a rearward hopper bottom mounted on said wheeled frame means, said forward hopper bottom having a having a forward hopper bottom forward end wall and a forward hopper bottom rearward end wall and said rearward hopper bottom having a rearward hopper bottom forward end wall and a rearward hopper bottom rearward end wall wherein said end walls of said forward and rearward hopper bottoms include upper ends having an integrally molded crossbeam therein.

28. The bulk material transporting trailer of claim 27, further comprising an attachment member integrally molded into each end of each of said crossbeams.

29. The bulk material transporting trailer of claim 28, further comprising a bracket for securing each of said attachment members of said crossbeam of said forward hopper bottom forward end wall and a respective one of said side wall members and for attaching a jack leg assembly to said wheeled frame means.

30. The bulk material transporting trailer of claim 29, further comprising a U-shaped support frame attaching member attached to said side wall member, wherein said bracket attaches said attachment member to said U-shaped support frame attaching member.

31. The bulk material transporting trailer of claim 29, wherein said channel is secured to said crossbeam of said forward hopper bottom forward end wall for attachment of a jack assembly support arm.

32. The bulk material transporting trailer of claim 31, wherein said jack assembly support arm is attached to said C-shaped channel via a jack assembly support arm bracket.

33. The bulk material transporting trailer of claim 28, further comprising a bracket for securing each of said attachment members of said crossbeam of said rearward hopper bottom rearward end wall and a respective one of said side wall members.

34. The bulk material transporting trailer of claim 33, further comprising a U-shaped support frame attaching member attached to said side wall member, wherein said bracket attaches said attachment member to said U-shaped support frame attaching member.

35. The bulk material transporting trailer of claim 33, wherein a C-shaped channel is secured to said crossbeam of said rearward hopper bottom rearward end wall for attachment to a rear trailer wheel frame.

36. The bulk material transporting trailer of claim 28, further comprising an elongated bracket for securing said attachment members of said crossbeam of said rearward hopper bottom forward end wall and said forward hopper bottom rearward end wall and a respective one of said side wall members.

37. The bulk material transporting trailer of claim 36, further comprising a U-shaped support frame attaching member attached to said side wall member, wherein said elongated bracket attaches said attachment member to said U-shaped support frame attaching member.

38. The bulk material transporting trailer of claim 36, wherein said forward hopper bottom rearward end wall and said rearward hopper bottom forward end wall are joined at adjacent ends by an apex member.

39. The bulk material transporting trailer of claim 38, wherein said elongated bracket further strengthens the juncture of said forward hopper bottom rearward end wall and said rearward hopper bottom forward end w all with said apex member.

40. The bulk material transporting trailer of claim 38, wherein said crossbeams are suitable for providing a structural transition from said end walls to one of said end wall members and said apex member.

* * * * *